United States Patent
Ohlsson et al.

(10) Patent No.: US 6,918,307 B2
(45) Date of Patent: Jul. 19, 2005

(54) DEVICE, SYSTEM AND METHOD FOR ON-LINE MONITORING OF FLOW QUANTITIES

(75) Inventors: Bertil Ohlsson, Västerås (SE); Ulrike Windecker, Malsfed (DE); Said Zahrai, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/820,149

(22) Filed: Apr. 8, 2004

(65) Prior Publication Data

US 2005/0031443 A1 Feb. 10, 2005

(30) Foreign Application Priority Data

Oct. 9, 2001 (SE) .............................. 0103371
Oct. 9, 2002 (SE) ................. PCT/SE02/01844

(51) Int. Cl.$^7$ ................................ G01F 1/78
(52) U.S. Cl. ................. 73/861.353; 415/30; 415/17
(58) Field of Search .............. 73/861.353, 861.36; 417/53; 415/30, 17

(56) References Cited

U.S. PATENT DOCUMENTS

| | | | | |
|---|---|---|---|---|
| 3,538,767 A | * | 11/1970 | Pfuntner et al. | ....... 73/861.353 |
| 4,700,578 A | * | 10/1987 | Fassbinder | ............ 73/861.354 |
| 4,767,280 A | * | 8/1988 | Markuson et al. | ....... 417/44.11 |
| 4,781,525 A | | 11/1988 | Hubbard et al. | |
| 4,821,581 A | | 4/1989 | Jost | |
| 5,318,409 A | | 6/1994 | London et al. | |
| 6,014,006 A | | 1/2000 | Stuntz et al. | |

FOREIGN PATENT DOCUMENTS

| | | |
|---|---|---|
| AU | 199527168 A1 | 2/1996 |
| DE | 19851795 A1 | 5/2000 |
| GB | 2313197 A | 11/1997 |
| WO | WO 9530130 A1 | 11/1995 |

* cited by examiner

*Primary Examiner*—Edward Lefkowitz
*Assistant Examiner*—Jewel V. Thompson
(74) *Attorney, Agent, or Firm*—Venable LLP; Eric J. Franklin

(57) ABSTRACT

Measures of a torque and rotational speed of a pump or fan are obtained, from which a mechanical input power can be calculated. By further using predetermined relations between mechanical input power and flow rate through the pump or fan, a measure of the flow rate can be derived without use of in-line flow or pressure sensors. In preferred embodiments the torque and/or rotational speed is obtained by measuring the input current and voltage of a motor driving the pump or fan and using predetermined relations between on the one hand current and voltage and on the other hand torque and rotational speed. Furthermore, also other flow properties, such as pump head, pump efficiency and total efficiency can be determined in this manner.

40 Claims, 9 Drawing Sheets

Fig. 1    PRIOR ART
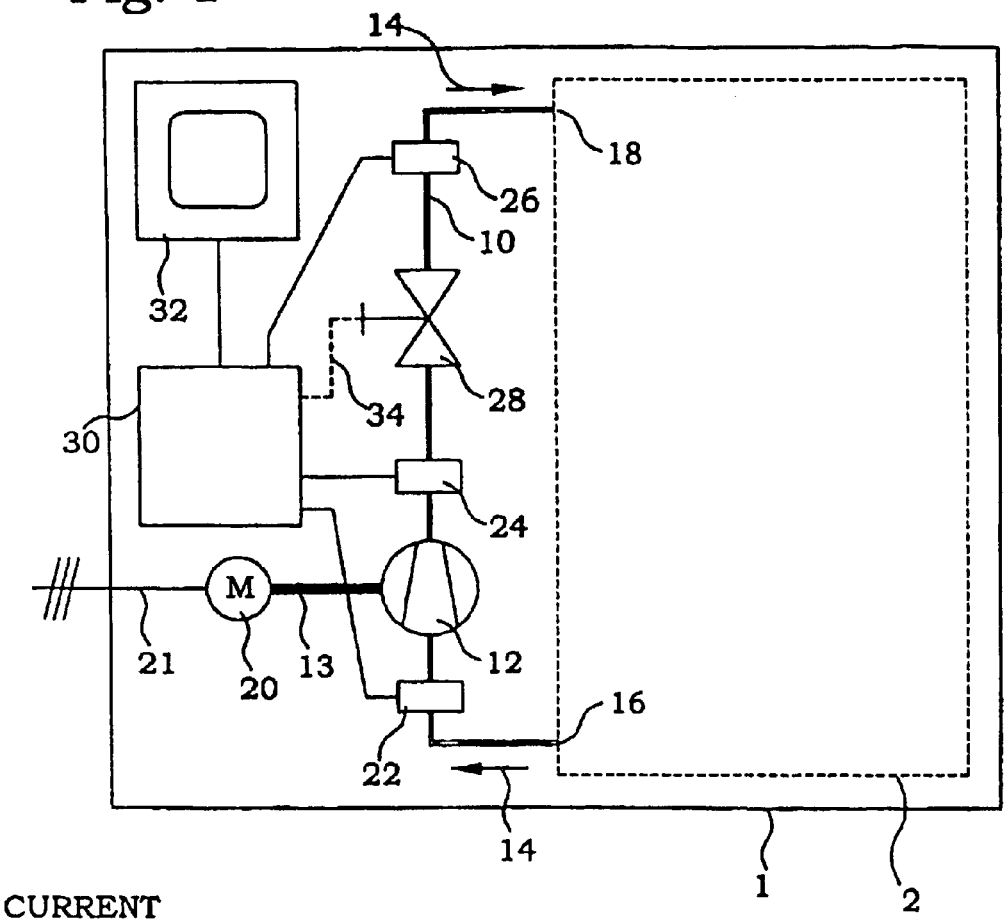
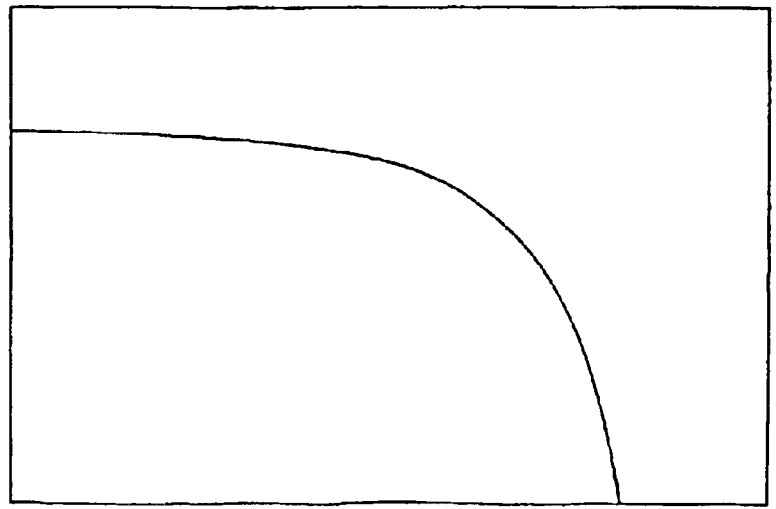
Fig. 10D

PUMP POWER INPUT

FLOW RATE

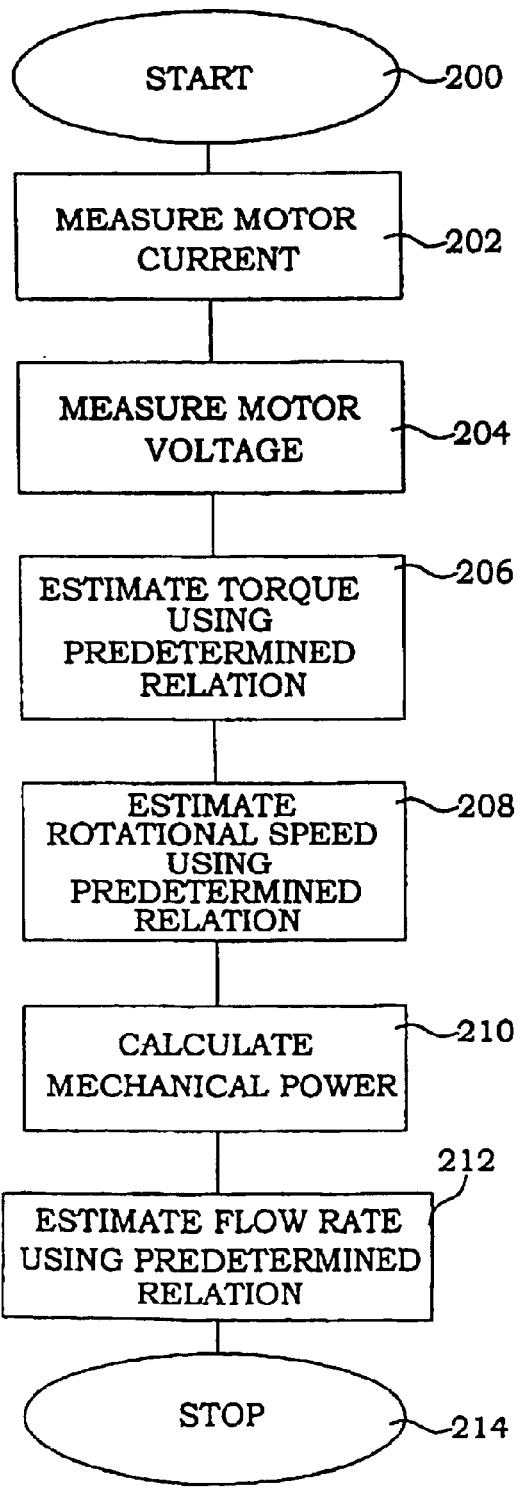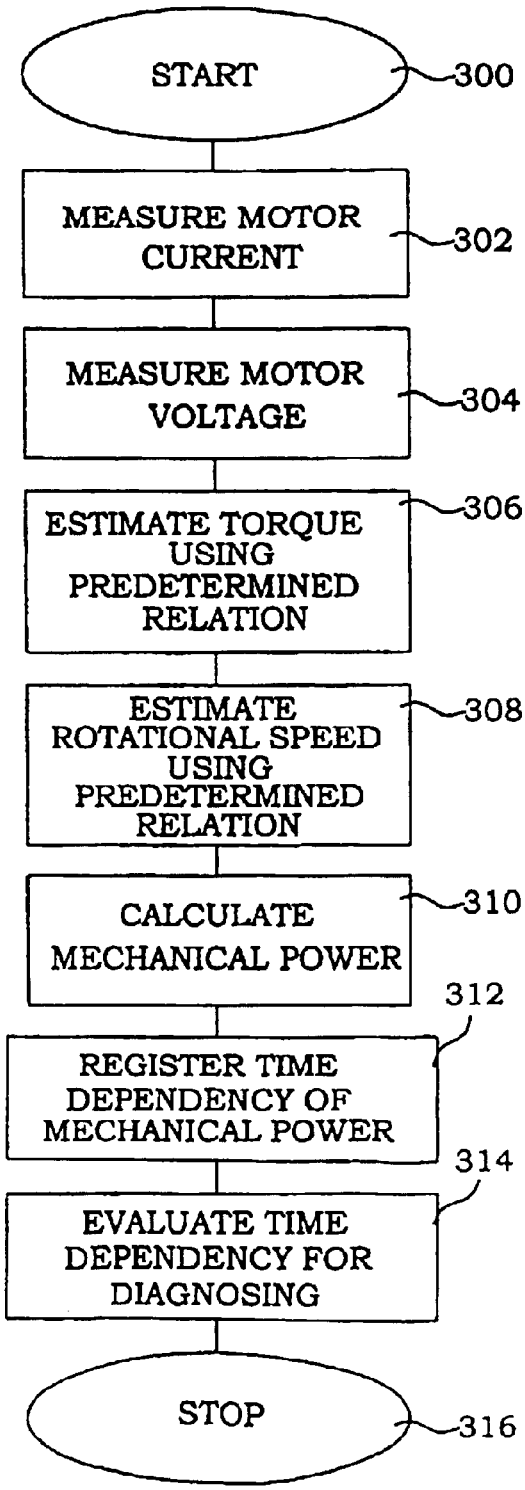
Fig. 12
Fig. 13

DEVICE, SYSTEM AND METHOD FOR ON-LINE MONITORING OF FLOW QUANTITIES

TECHNICAL FIELD

The present invention relates to monitoring and control of flow quantities in association with pumps or fans.

BACKGROUND

Many process systems of today include flows of different fluids, where the flow is created by a fan or pump. In many cases, the flow rate and other quantities related to the flow are of crucial importance or at least of interest for controlling the process. The measured flow and related quantities are typically used as input parameters in monitoring, measuring and/or controlling processes. There is thus a general request in many process systems involving fluid flows for measuring flows and pressures caused by different flow-creating means, i.e. essentially fans and pumps.

The straightforward approach used in prior art employs the use of direct measurements of flow-related quantities. In DE 198 51 795 A1, a system and a method for textile treatment are disclosed. A respective pressure sensor is introduced within a flow line of treatment fluid immediately before and after a pump. The pressure difference is used to control the operation of the pump in order to provide the right flow of treatment fluid in the process.

Hence, in such system and systems of a similar design, a number of sensors have to be introduced into the flow, which always exposes the sensors to wear and potential damage. Furthermore, sensors introduced in-line also increase the risk for changing or disturbing the actual flow in an unfavourable manner. Replacement or repair of such sensors will typically cause an operation stop of the process system, which often is very costly. Also the sensors themselves are relatively costly. There are thus a number of disadvantages with flow measurements according to prior art.

In the patent application AU 27168/95, a pump monitoring apparatus is disclosed. This apparatus monitors the pump motor in order to achieve a measure of the run time of the pump. By an a-priori knowledge of the expected pump capacity and pump efficiency, a throughput can be calculated by multiplying with the actual operation time ratio. This procedure is only applicable where capacity and efficiency are known in advance.

In U.S. Pat. No. 4,781,525, a flow measurement system is disclosed, where blood flow rate through a centrifugal pump is measured. A rotational speed is obtained by a rotational speed sensor. The sensor is directly measuring the speed of the motor shaft, mechanically, optically or in any other direct manner, as clearly indicated by a broken line in the disclosed figures. Furthermore, a parameter representative of the motor torque is obtained. The blood flow rate is computed as a function of the measured rotational speed and the obtained motor torque. A problem with the devices disclosed in U.S. Pat. No. 4,781,525 is that a separate rotational speed sensor has to be provided, which is both expensive and in many cases also difficult to provide for mechanical reasons.

SUMMARY

It is thus a general object of the present invention to provide devices and methods for improving monitoring, control and diagnosing of systems involving a fluid flow. A further object of the present invention is to provide devices and methods, which allow for on-line measurements of flow quantities. Another further object is to provide such devices, which are cheaper than the prior art solutions. Another object is also to provide devices and methods, which are easily integrated into existing equipment, such as frequency converters or soft starters of pump or fan motors.

The objects above are achieved by devices and methods according to the enclosed claims. In general words, by obtaining measures of a torque and rotational speed of a pump or fan, a mechanical input power can be calculated. By further using predetermined relations between mechanical input power and flow rate through the pump, a flow rate that corresponds sufficiently accurately to the actual flow rate under normal circumstances can be derived without use of in-line flow or pressure sensors. The torque and/or rotational speed is obtained by measuring the input current and voltage of a motor driving the pump or fan and using predetermined relations between on one hand current and voltage and on the other hand torque and rotational speed. Furthermore, also other flow properties, such as pump head, total efficiency and pump efficiency can be determined in this manner. By evaluating time dependencies of flow, power or efficiency quantities, diagnosing of the operation can be obtained. The invention is easily applicable on constant speed pumps and fans, but can also be used with other types of equipment.

Further advantages are that there is no need for installing any sensors directly in or on the flow path, which makes installation, substitution or repair possible without interrupting the flow. However, the measurements and calculations of the requested quantities are performed in the direct vicinity of the flow path, which makes the method possible to apply for controlling purposes. No time-consuming off-line analyses have to be performed.

BRIEF DESCRIPTION OF THE DRAWINGS

The invention, together with further objects and advantages thereof, may best be understood by making reference to the following description taken together with the accompanying drawings, in which:

FIG. 1 is a flow system according to prior art making use of in-line flow sensors;

FIGS. 10A-E are diagrams illustrating different pump or motor characteristics used by the present invention;

FIG. 12 is a flow diagram illustrating a preferred method according to one aspect of the present invention; and FIG. 13 is a flow diagram illustrating a preferred method according to another aspect of the present invention.

DETAILED DESCRIPTION

Figure 2:
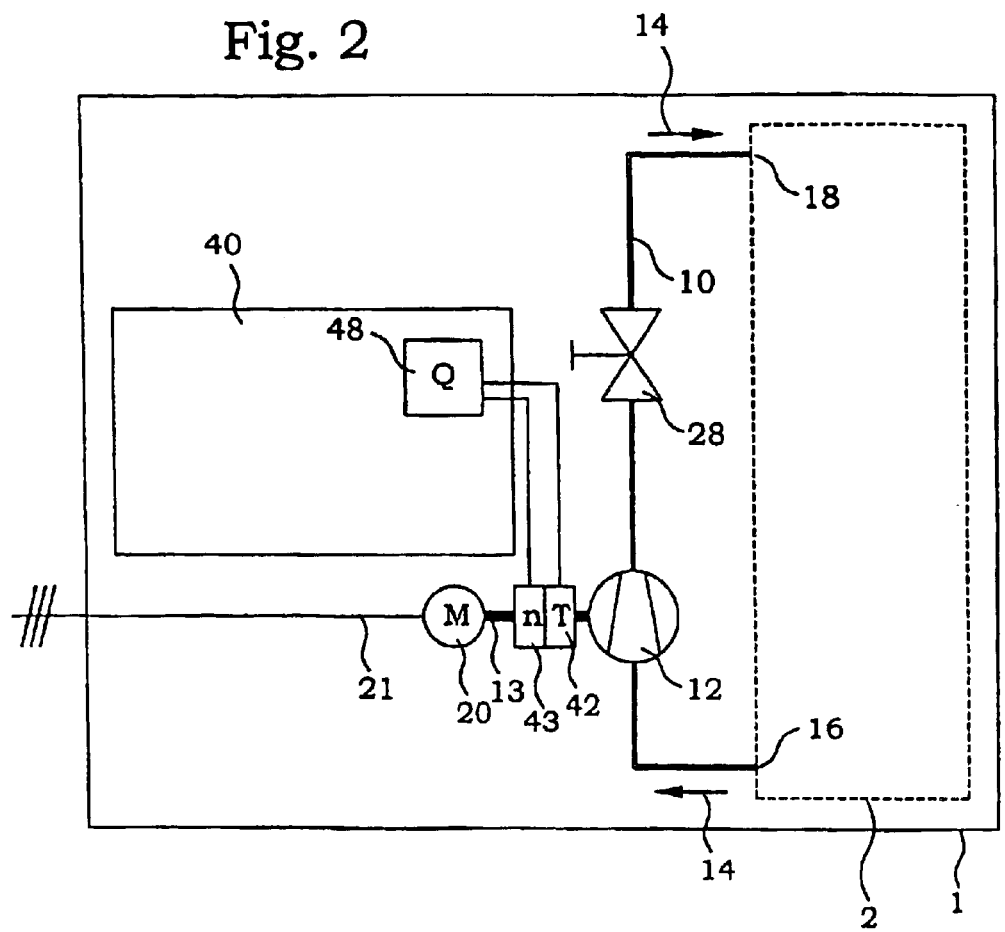
FIG. 2 is another flow system according to prior art making use of direct rotational speed measurements.

The potential application areas of the present invention are covering a wide range of technical fields. Non-excluding examples are e.g. water transport, food industry, pulp manufacturing, slurry pumping, oil and gas transport, chemical industry and ventilation systems. Anyone skilled in the art easily understands that the list of possible applications can be made far more extensive.

The present invention can be utilised in systems where a fan, pump or other flow-creating device causes a flow of fluid or pressure rise. Preferable embodiments involve such flow-creating devices driven by electric motors.

In order to illustrate the benefits of the present invention, this description starts with a brief description of a typical system according to prior art, illustrated in FIG. 1. A flow system 1 comprises a flow path 10 of a fluid, e.g. a liquid, a gas, a mixture of gases, a mixture of liquids, a mixture of gases, liquids and solids, an emulsion, a slurry, a suspension etc. A flow-creating device 12, e.g. a pump or a fan, creates a flow (indicated by the arrows 14) of the fluid within the flow path 10. The fluid is thus transported from an inlet point 16 to an outlet point 18, being the interface with the rest of the system, indicated by the broken square 2. The flow-creating device 12 is driven by an electric motor 20, in this example a three-phase motor. In the flow path 10, two pressure sensors 22, 24 are inserted on each side of the flow-creating device 12. Furthermore, a flow-rate meter 26 is also present in the flow path 10. A valve 28 is present as an example of a device possible to use for controlling the flow in the flow path 10. A data acquisition unit 30 is connected to the three sensors 22, 24 and 26 for receiving signals from sensors representing pressures and flow-rates. The measurements are evaluated and the result in the form of a determined flow is presented at a monitor 32. The result may also be used for controlling purposes as indicated by the broken line 34.

Throughout this description, different sensors are discussed. It is obvious for anyone skilled in the art that most sensors are accompanied by some kind of control devices, either provided separately or integrated in any other equipment.

In FIG. 2, another prior-art flow system is illustrated. Identical or similar parts are given the same reference numbers as in FIG. 1. Here we assume that the flow-creating device is a pump 12. However, the same principles are valid also for fans. Anyone skilled in the art immediately realises that all three in-line sensors are removed. Instead, means for obtaining a measure of a torque T, in this embodiment a torque sensor 42, is introduced, which obtains a signal representing a measure of the torque T on the pump 12. The torque sensor 42 is connected to an evaluation means 40 and the torque T value is inputted thereto. A signal representing a measure of the rotational speed n of the pump 12 is in this embodiment obtained by a rotational speed sensor 43, as indicated in the figure. A flow-rate determination means 48 uses the torque T and the rotational speed n to determine an estimated value of the flow rate.

Figure 3:
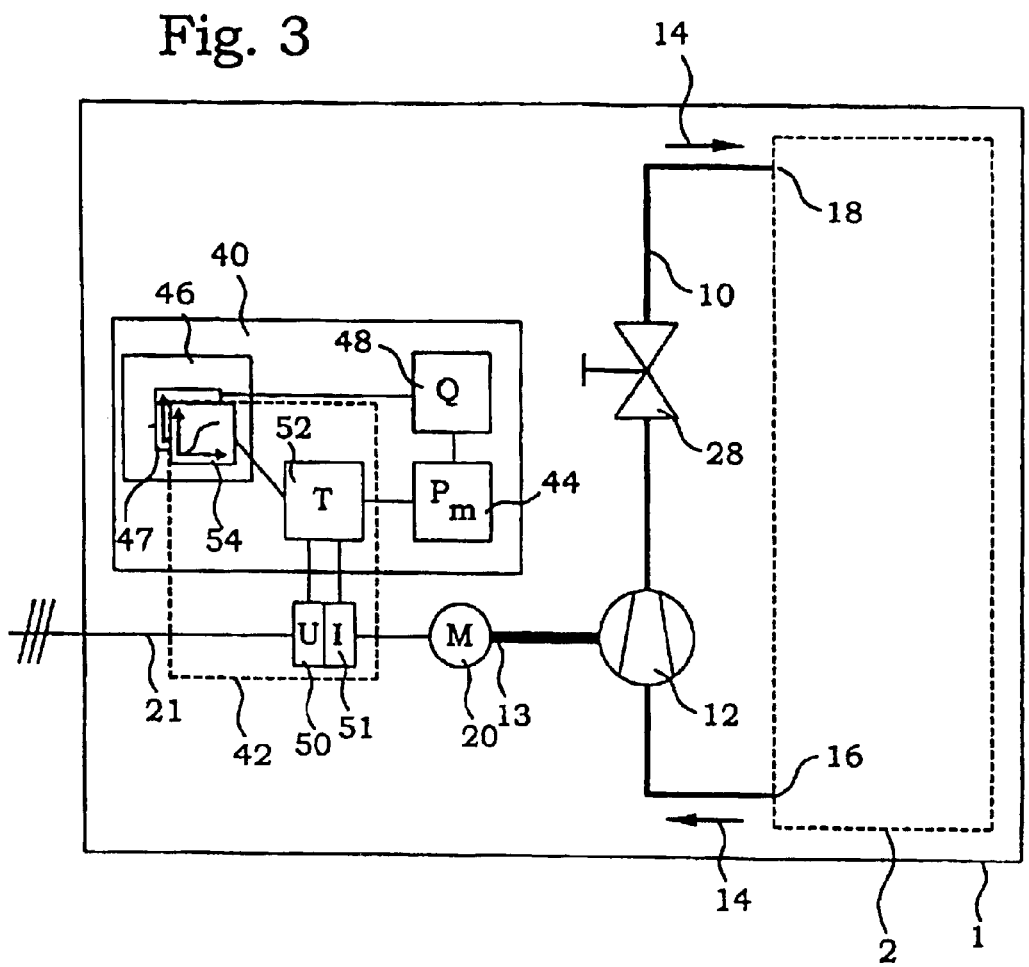
FIG. 3 is a flow system, based on current and voltage measurements of a constant speed pump.

In FIG. 3, another embodiment of a flow system is illustrated. In this system, the pump is a constant speed pump, why the value of the rotational speed n is assumed to be known in advance. No separate input of this value is needed since the value is incorporated directly in the calculations as a constant. In this embodiment, the means for obtaining a measure of a torque 42 comprises a current sensor 50 and a voltage sensor 51, measuring the electrical input quantities of the motor 20. The measured values of input voltage and input current of the motor 20 are supplied to a torque determining means 52, in this embodiment comprised in the evaluation means 40. The torque determining means 52 is further connected to a storage means 46, which is supplied with relations 54 between input current and voltage, and output torque of the motor 20 in question. By using these motor characteristics 54, possibly by use of an appropriate motor model, the measured values of input current and voltage can be transferred into an output torque of the motor. This calculated torque is then used in a calculating means 44 to provide the mechanical input power of the associated pump or fan 12. This is possible to obtain by the relation:

$$P_m = 2\pi \cdot n T,$$

where n is the rotational speed of the pump 12. Since n is already known, the mechanical input power is readily calculated based on the determined torque. If the motor 20 is a three-phase motor, more than one current sensor 50 and/or more than one voltage sensor 51 might be necessary. In cases where the current and voltage measurement do not involve phase information, the phase difference between the voltage and current has preferably to be measured.

The storage means 46 of the evaluation means 40 further comprises data representing a relation 47 between mechanical input power $P_m$ and flow rate Q for the pump in question. This relation 47 may be stored as an equation, as a look-up table or in any other suitable form. The flow-rate determination means 48 uses the calculated mechanical input power $P_m$ to determine an estimated value of the flow rate Q.

Figure 4:
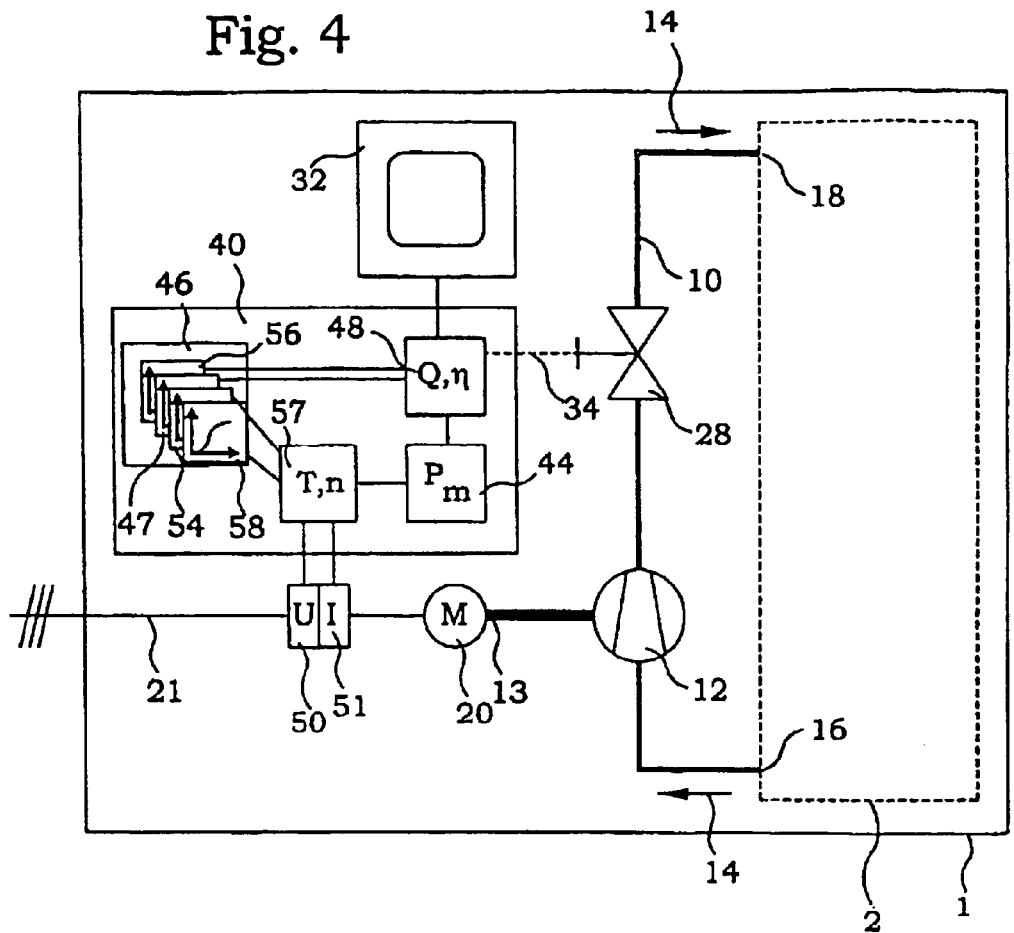
FIG. 4 is a flow system according to an embodiment of the present invention, based on current and voltage measurements of a variable speed pump.

In FIG. 3, the pump or fan was assumed to be a constant speed device. However, also many varying speed devices are used for creation of flows. In such cases, the rotational speed has to be measured, directs or indirectly, and entered as a parameter in the mechanical input power calculations of the calculating means 44. According to the present invention, as illustrated in FIG. 4, the rotational speed is calculated, based on the already measured input current and voltage to the motor 20, using a predetermined relation 58 between input current and voltage and the rotational speed, typically obtainable from motor characteristics and a motor model, discussed more in detail below. In a frequency converter, the rotational speed is proportional to the (known) frequency of the supplying electric network. The means for obtaining a measure of a rotational speed 43 may in such an embodiment comprise the current and voltage sensors 50, 51, a rotational speed determining means 57 and the part of the storage means 46 comprising the appropriate motor characteristics 58.

Furthermore, selected values can be displayed at a monitor 32 in a conventional manner, and/or be used for controlling purposes 34. Most parts of the evaluation means are preferably implemented by software in processors.

In the embodiment of FIG. 4, the storage means 46 further comprises a relation 56 between flow rate and pump efficiency $\eta_P$. This data is then used to obtain the pump efficiency $\eta_P$ of the particular pump in question, in this embodiment within the flow determination means 48 or connected thereto. The pump efficiency $\eta_P$ may also be displayed at a monitor 32. In similar fashions, other flow system related quantities might be obtained, such as pump head or total efficiency $\eta_T$, by using predefined relations between the quantities and e.g. the determined flow rate.

Figure 5:
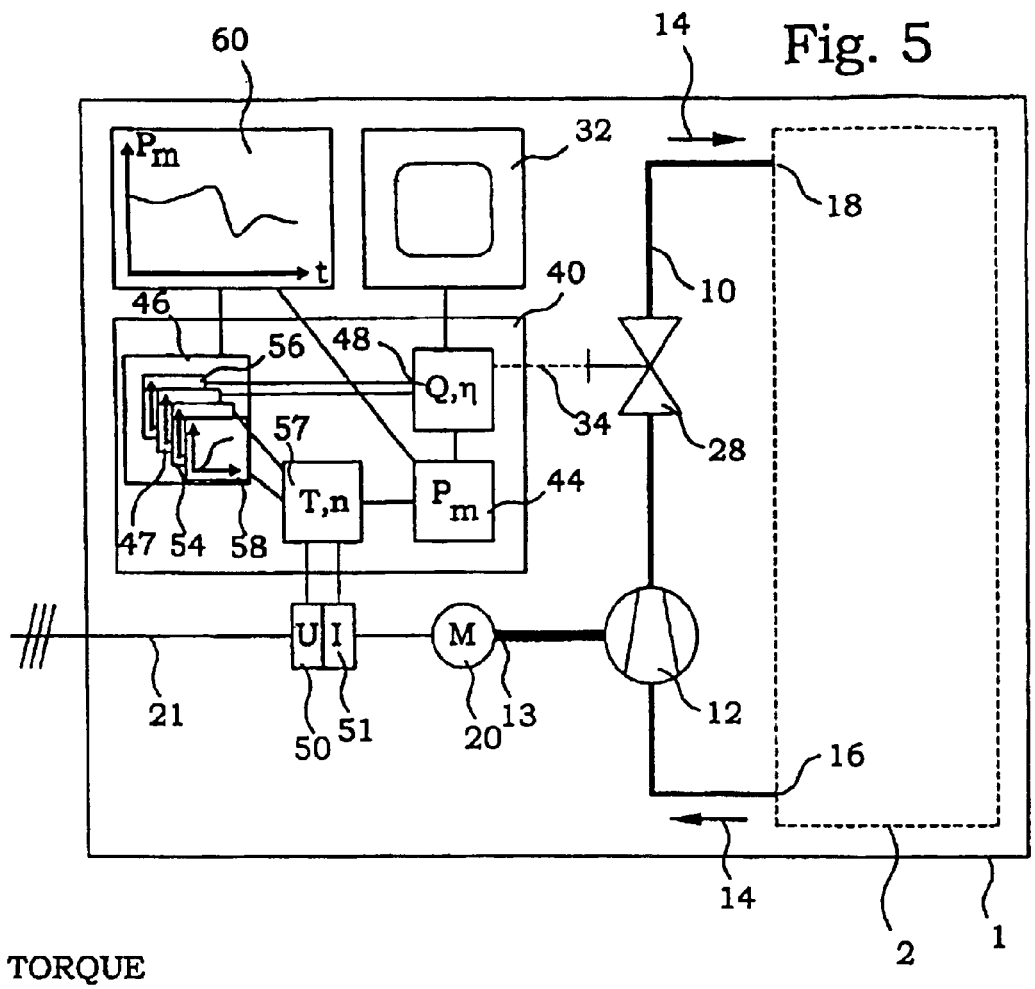
FIG. 5 is a flow system according to an embodiment of the present invention, having evaluation means for time dependencies.

FIG. 5 illustrates a further embodiment of a flow system according to the present invention. This embodiment is closely related to the embodiment of FIG. 4. A diagnosing means in the shape of an event registration means 60 is connected to the calculation means 44 and registers the time evolution or time dependency of the mechanical input power $P_m$ to the pump or fan 12. This event registration means 60 preferably comprises a processor for evaluating the registered behaviours. This time evolution is preferably also stored in the storage means 46 together with current values of other relevant process parameters. The time evolution is preferably compared with changes of process parameters performed during the registered time period, and changes in mechanical input power $P_m$ can thus be correlated to such parameter changes. Preferably, the time evolution is also compared with stored time evolutions of earlier operations, also stored in the storage means 46. In this manner, changes in flow quantities caused by alterations of process parameters may be separated from changes having other causes, such as wear, malfunctioning equipment, obstacles in the flow etc. Examples of such diagnosing procedures are given further below.

Figure 6:
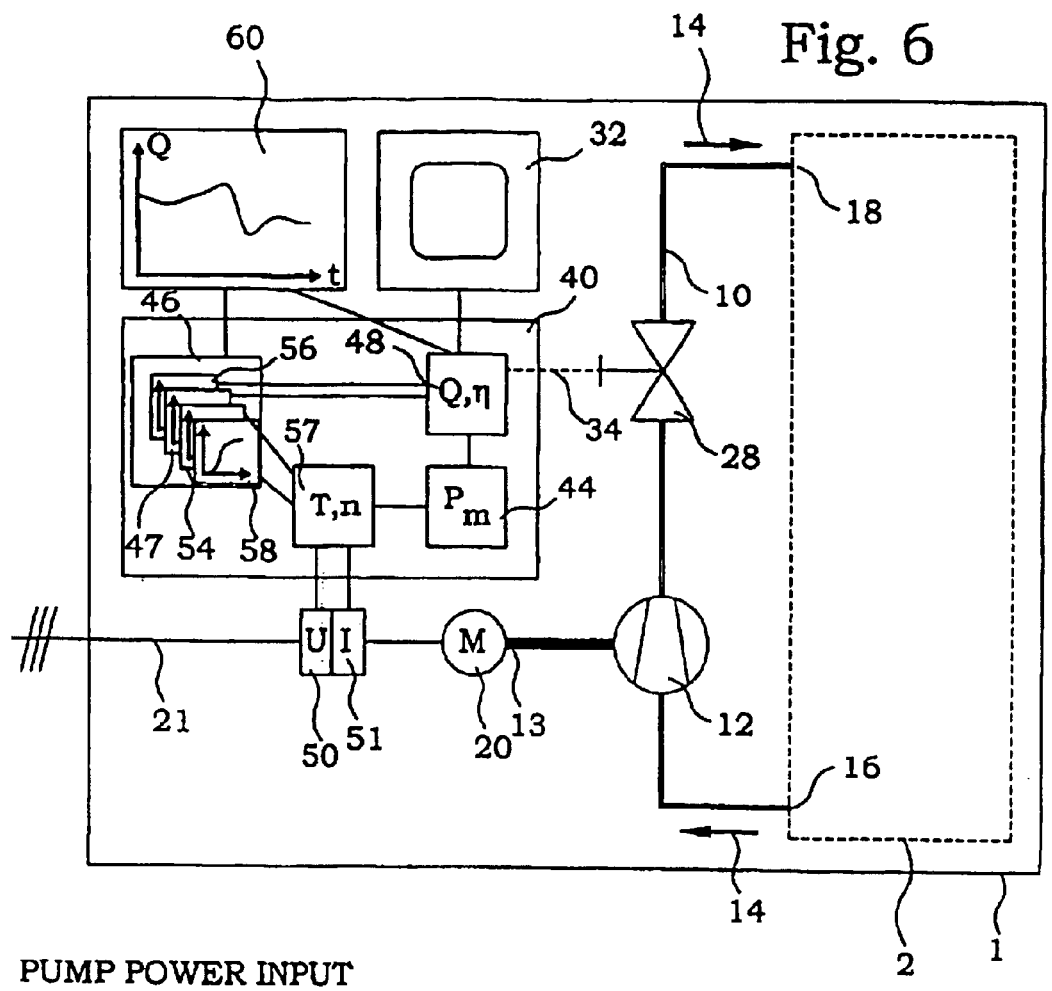
FIG. 6 is a flow system according to another embodiment of the present invention, having evaluation means for time dependencies.

FIG. 6 illustrates an alternative embodiment. Here, the event registration means 60 instead registers the time evolution of the calculated flow Q. Since there is a direct relation between the two parameters, either quantity should be possible to use as an event indicator. Also other flow parameters, such as pump head, pump efficiency $\eta_P$ etc. could be used for diagnosing purposes. A unit or functionality for determining a value of an electric motor efficiency $\eta_E$ is also easily integrated, connected to the current sensor 50 and voltage sensor 51 and the calculation means 44. The electrical motor efficiency $\eta_E$ is then easily obtained as the ratio between the electrical input power to the motor and the mechanical power transferred to the pump 12. A total efficiency $\eta_T$ can also be obtained by e.g. multiplying the electric motor efficiency $\eta_E$ and the pump efficiency $\eta_P$, preferably in a means connected to relevant other means in the evaluation means 40.

As anyone skilled in the art realises after reading the present disclosure, the features of the present invention do not directly influence the flow in the flow path. There is no need for installing any sensors directly in or on the flow path, which makes installation, substitution or repair possible without interrupting the flow. However, the measurements and calculations of the requested quantities are performed in the direct vicinity of the flow path, which makes the method possible to apply for controlling purposes. No time-consuming off-line analyses have to be performed.

Due to this modular design, the different means of the present invention are easily incorporated in or together with other equipment of the system. A frequency converter, which often is applied for controlling the motor operation, has already the ability for obtaining a measure of the input voltage, input current, rotational speed and sometimes even torque. These values can therefore easily be forwarded to be used according to the present invention. The different means of the present invention are therefore easily integrated in frequency converters, or supplied as add-on modules.

Similarly, many motors driving a fan or pump are controlled by soft starter equipment. Such equipment is mainly operable at starting and stopping the motors in appropriate manners, but the use may also be extended to incorporate also operation control. Thus, by introducing a device according to the present invention in a soft starter, the utilisation of the soft starter equipment can be extended also to cover steady-state operation. A soft starter typically measures the input current and/or the input voltage of the motor, and an integration of the characterising means of the present invention into the soft starter is therefore easily performed.

In the different embodiments illustrated above, the most parts directly associated with the present invention are collected in the evaluation means 40. Anyone skilled in the art understands that the evaluation means 40 can be supplied as one unit as well as distributed units, being parts of other system means. Similarly, the storage means 46 is illustrated as a single means, but may also be divided into smaller units.

In many applications, the position of an operator is often remote from the actual equipment. It is therefore in many cases preferable to have the monitor positioned remotely in relation to the pump or fan. This monitor may then also be a part of an overall control system. In particular, results of the evaluation may advantageously be communicated by use of Internet, for the purpose of remote monitoring and control.

Figure 7:
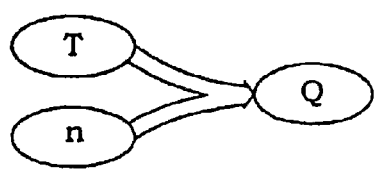
FIG. 7 is an illustration of the processing of information in a flow system of FIG. 2.

An important feature of the present invention is the use of predetermined relations between mechanical input power and flow rate in a pump or fan. In preferred embodiments further predetermined relations are used. This processing of different quantities, not directly associated with flow quantities, and predetermined relations characterises the present invention. In FIG. 7, a simple sketch illustrating the processing of information is shown, which corresponds to the embodiment of FIG. 2. The quantities T and n, i.e. the torque and rotational speed, are determined in one or another way. Together, they give an opportunity to estimate the flow rate Q.

Figure 8:
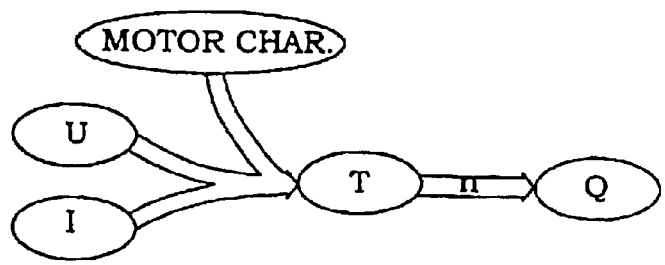
FIG. 8 is an illustration of the processing of information in a flow system of FIG. 3.

In FIG. 8, a similar sketch illustrates the conditions of FIG. 3. Here, the input voltage U and current I of a motor driving the pump or fan are processed into a torque T. Since this particular embodiment concerns a constant speed machine, the rotational speed n is known, and the flow rate Q is then calculated.

Figure 9:
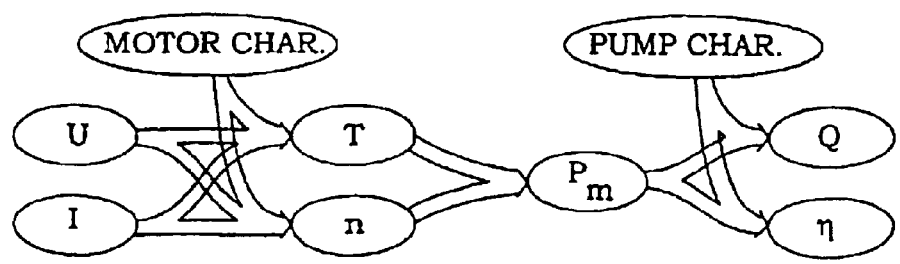
FIG. 9 is an illustration of the processing of information in a flow system of FIG. 4.

Finally, in FIG. 9, the system of FIG. 4 is illustrated in an Information flow sketch according to the present invention. Here, in addition to the flows of FIG. 8, the input current and voltage are used together with predetermined motor characteristics to compute the torque T as well as the actual rotational speed n of the motor. These quantities are subsequently used to calculate the mechanical input power $P_m$. This quantity in turn can with the support of predetermined pump characteristics, in particular the relation between input power and flow rate, be used to estimate the flow rate Q.

Furthermore, the pump or fan efficiency $\eta_P$ is here also deduced using the mechanical input power of the pump or fan and other pump characteristics, namely a relation between mechanical input power and efficiency $\eta_P$. Alternatively, the efficiency $\eta_P$ can be calculated starting from the flow rate and using a predetermined relation between flow rate and efficiency $\eta_P$ instead.

The predetermined pump or fan characteristics can be obtained in different ways. Manufacturers often supply performance data together with a pump or fan. A typical such curve for a constant speed centrifugal pump is illustrated in FIG. 10A. The curve is only an illustrative example, and other flow-generating devices, e.g. displacement pumps or fans, have other characteristic features in their relations. The method of the present invention is, however, applicable to all different equipment as long as there exist a monotonic relation between $P_m$ and Q. In the present example, the input pump power $P_m$ is shown as a function 100 of flow rate Q. The function is monotonic and can thus be expressed also as an inverse function. By inputting a certain input pump power into such an inverse function, the corresponding flow rate will result. By storing this relation between input pump power and flow rate in a storage means in the control means of the flow system, a conversion between input pump power and flow rate is readily available. The storage can be performed as a mathematical function, as a look-up table or similar conventional ways of representing a relation.

If the manufacturer does not supply a curve, such as the one shown in FIG. 10A, the relation can be easily determined in a test set-up, prior to the installation of the pump. In a typical case, only a few points in the diagram have to be determined, and equations or models are then used for interpolation and extrapolation of these measured points.

Another pump property that often is supplied by the manufacturers is the pump head as a function of the flow rate. An example is illustrated in FIG. 10B. The pump head or the pressure difference over the pump is in a typical case a smooth function of the flow rate. Since the input pump power is a monotonically increasing function of flow rate, there is a defined relation also between input pump power and pump head. In a similar manner as for the flow rate, the pump head can be calculated only from the input pump power, or via the already calculated flow rate.

When knowing the pump head and flow rate, the efficiency $\eta_P$ of the pump can be calculated as:

$$\eta_P = \frac{Q \cdot H \cdot \rho \cdot g}{P_m},$$

where H is the pump head, $\rho$ is the fluid density and g is the gravity constant.

Figure 10E:
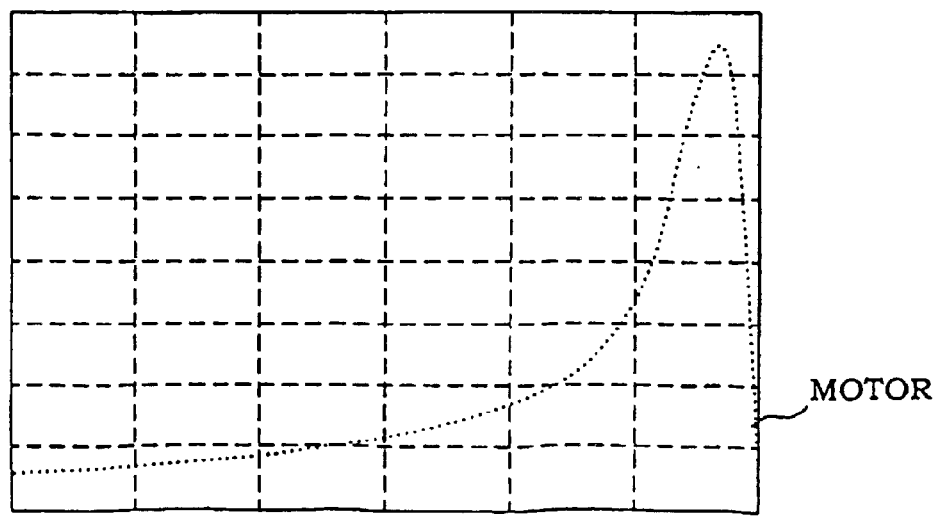
Figure 10A:
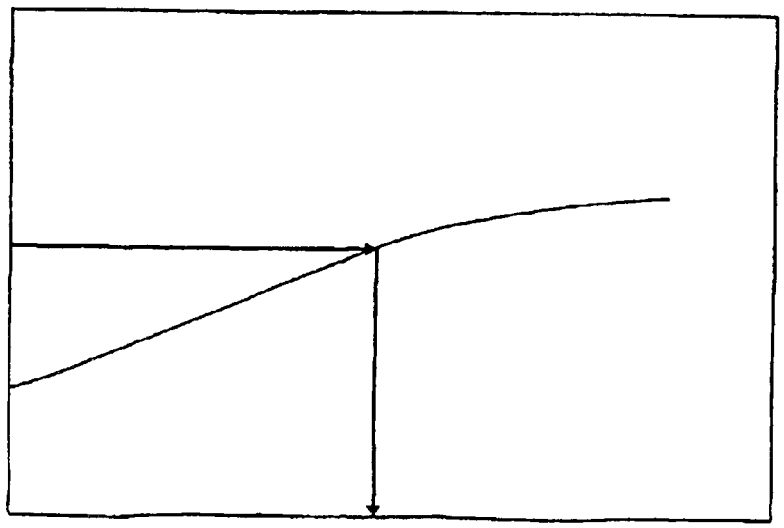
Figure 10B:
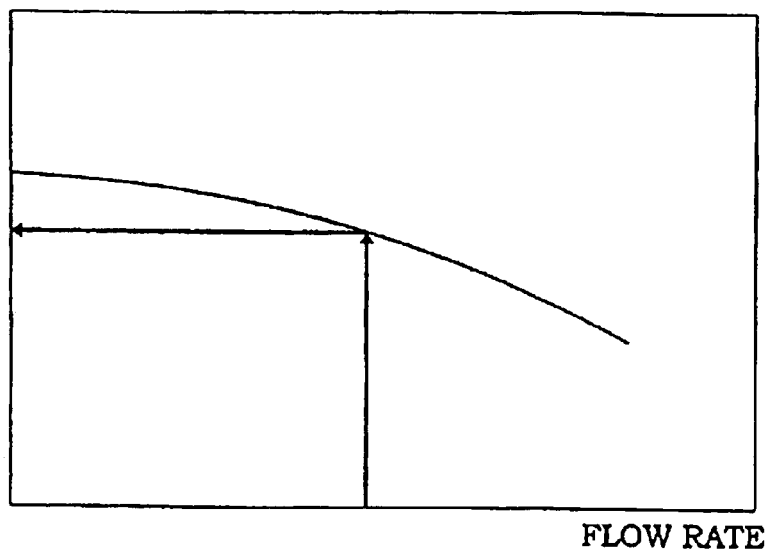
Figure 10C:
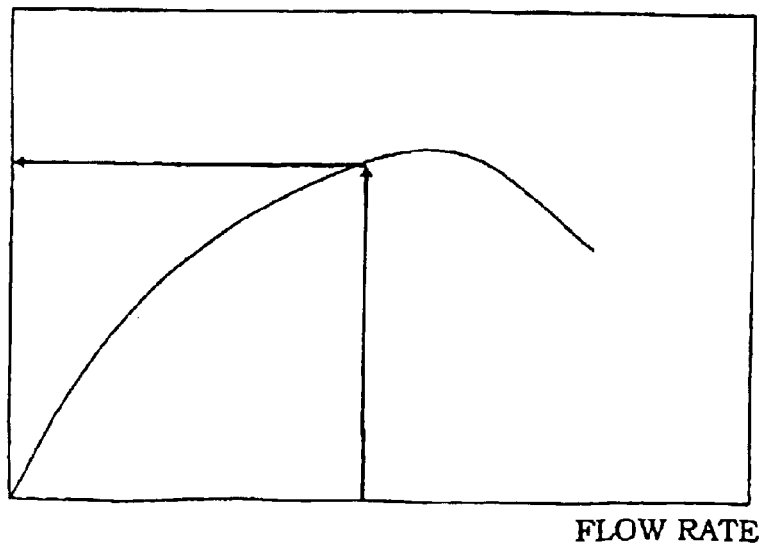

This means that the two diagrams of FIGS. 10A and 10B can be combined to a relation between input pump power $P_m$ and the pump efficiency $\eta_P$, as illustrated by FIG. 10C.

For motors, where the rotational speed is not constant during operation, e.g. operation with frequency converters, or pumps operated at a different rotational speed than the nominal one for which characteristics are provided, the quantities of interest can easily be derived by affinity laws:

$$Q_1 = \frac{n_2}{n_1} Q_1, \quad H_2 = \left(\frac{n_2}{n_1}\right)^2 H_1,$$

where $n_1$ and $n_2$ are two different rotational speeds.

In the embodiments using calculations of the torque of the pump, motor characteristics and possibly also motor models are used. FIG. 10D illustrates an example of a typical predetermined relation between current and rotational speed for an asynchronous motor. The relation is monotonic, which means that there is a one-to-one relation between each value of rotational speed and current for a specified voltage. One such relation exists for every value of supplied voltage. For each set of current and voltage, a corresponding rotational speed is derivable.

Furthermore, FIG. 10E illustrates other motor characteristics, a relation between rotational speed and torque for a given input voltage of an asynchronous machine. This implies that also here, there exists one such relation for each input voltage. By combining the curves of FIGS. 10D and 10E, associated with a certain input voltage, a current value corresponds to one unique torque value. In this manner, both torque and rotational speed can be derived starting from input current and input voltage, by means of predetermined motor characteristics. A relation can also be obtained by using different models, as discussed more in detail below.

Such motor characteristics are sometimes available from e.g. the manufacturers, as examples of the motor properties. If there are not sufficient data, the relations may be directly determined either in connection with the manufacturing of the motor or prior to installation. Such relations are then obviously reliable, but the amount of efforts to obtain it is large. Another possibility is to measure just a few critical points at the curves and estimate the rest of the relation based on these few values. These values should preferably be standard data almost always supplied by a motor manufacturer. The behaviour from one motor to another or from one type to another is believed to be rather similar, and the variations are smooth, which would lead to rather reliable relations.

When obtaining the different motor relations, one may preferably make use of a model of the motor. In one possible motor model, the motor is approximated by an equivalent circuit. In this circuit, the rotor and stator windings are expressed as a circuit of ideal inductances and resistances. By measuring a few points experimentally, values of these inductances and resistances can be obtained, and the circuit can then be used to determine points in between the measured ones. The detailed design of the equivalent circuit depends on the required accuracy as well as on the type of motor.

For an electric circuit model, the following relation can be used:

$$P_m = P_e - P_{loss}$$

where $P_m$ is the mechanical power, $P_e$ is the electrical power supplied to the motor and $P_{loss}$ is the power losses in the motor. $P_e$ is easily determined by measurements of supplied current and voltage, and $P_{loss}$ can be obtained by use of e.g. an electric circuit model of the motor.

The electric circuit model of the motor is one suitable model. However, there are also other different models, which may serve as models for calculating e.g. the output torque of a motor.

It is obvious that the present invention relies on that the used predetermined relations are sufficient reliable. The reliability of the motor characteristics has been tested experimentally in connection with soft starters, and has been found to be sufficient, at least for soft starter applications. Such reliability will be sufficient also for the applications suggested in the present invention. The reliability of the pump or fan characteristics have been experimentally evaluated in a test equipment, measuring the pump torque as well as pump head and flow rate. The actually measured relations between on the one hand the torque and on the other hand flow rate and pump head have been compared with the characteristics supplied by the manufacturers. The tests verified that most curves supplied by the manufacturers were sufficiently reliable for the present application. Furthermore, the measured relations were reproducible within surprisingly small margins. These results thus point to the possibility to use predetermined pump characteristics not only as a guide for selecting the appropriate pump for the task in question, but also for controlling purposes.

The above discussions are mainly valid for processes involving steady-state operation or quasi-steady-state operation of the fan or pump. For rapid courses of events, one may not generally rely on the steady-state relations. However, for rapid operation changes, which are occurring frequently, special relations may be utilised. The present invention is thereby possible to use also on non-steady-state operations, provided that the proper relations are available.

Figure 11A:
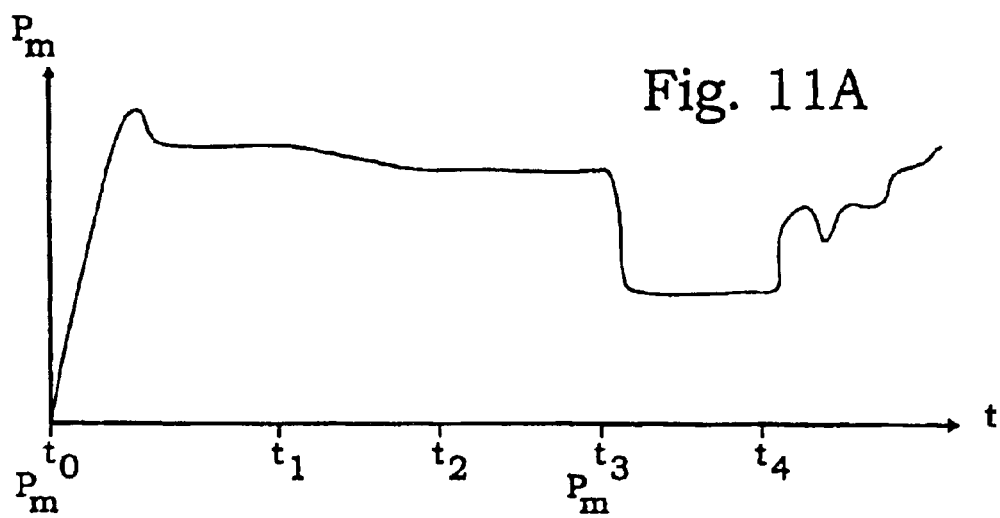
FIGS. 11A-D are diagrams illustrating the possibility for diagnosing by the use of time dependencies.
Figure 11B:
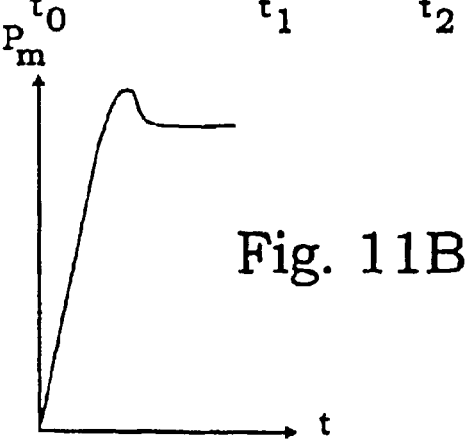
Figure 11D:
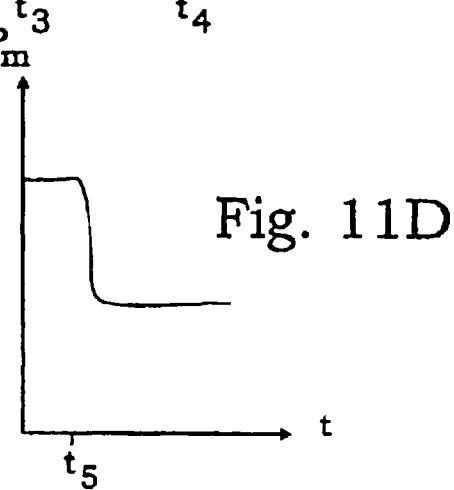
Figure 11C:
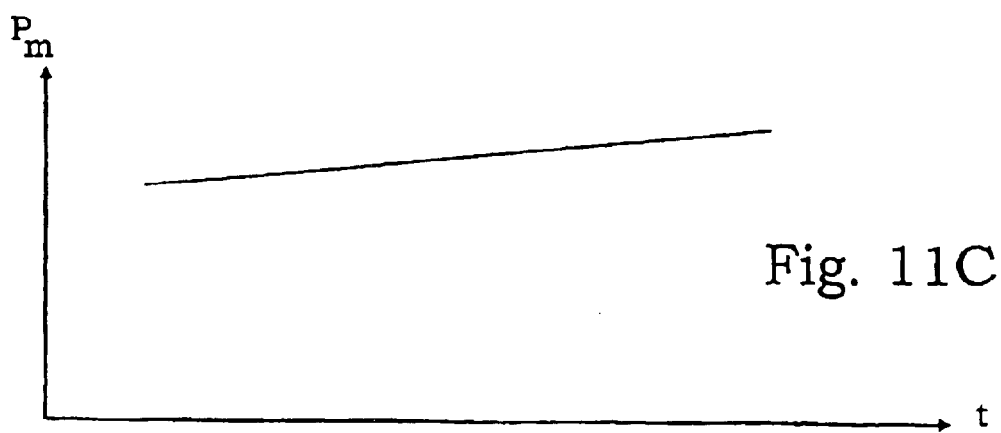

In embodiments registering the time evolution of input pump power or flow quantities, a further advantage is available. By just measuring e.g. the flow, the system can be controlled by utilising this value. However, if other system parameters are changed, and one wants to verify that the purpose of the change was achieved, the time factor has to be taken into account. A change in system parameters influencing the flow leads to a certain time evolution of the derived flow parameters. By storing earlier events, when the changes had the requested results, and comparing the actual situation with such stored operation situations, it is possible to determine if the change was successful. FIG. 11A illustrates a possible measured time evolution of the input pump power. The surrounding events were as follows. The system was turned on at $t_0$. Between $t_1$ and $t_2$, the surrounding temperature slowly increased. (In this example, the fluid is most probable a gas, having a large temperature dependency of the density.) At $t_3$ a certain system parameter was changed. FIG. 11B-D illustrates stored time evolutions of the input pump power at certain earlier occasions of the same system. FIG. 11B illustrates a successful system start half a year earlier. FIG. 11C illustrates the conditions during a controlled cooling of surrounding temperature. FIG. 11D illustrates the input pump power at an earlier change of the same system parameter at time $t_4$.

At a comparison between the registered time evolution and the stored previous behaviours, it is easily observable that the registered curve first presents a normal starting behaviour. The exact reasons for the details in the curve have not to be known in detail. The general shape and the size are normal and the start seems to be successful. At time t2, an increase in surrounding temperature occurs, which causes a change in the measured parameter, which is in accordance with the behaviour of FIG. 11C. When the system parameter change occurs at $t_3$, the resulting curve also presents the assumed behaviour. The system behaves as expected.

However, at time $t_4$, the time evolution in FIG. 11A shows some features, which can not be correlated to any intentional or unintentional parameter changes. The system acts strange and this calls for a more thorough investigation of the system. The causes can be of vastly different origins. There might be malfunctions or damages in the pump or motor, which means that the used relations are not longer valid. Other possibilities could be that the flow path is affected, e.g. a leak or an obstructing object. Dryrunning of the pump, cavitation at the pump blades or uncontrolled changes in the fluid properties might also be the cause. Even if the actual reason for the strange behaviour can not be obtained directly, the behaviour calls for a further investigation of the system.

At a closer evaluation, it is possible to see that the detailed shape and size of the starting portion of the curve in FIG. 11A differs a small amount compared to the curve of FIG. 11B. By registering also such small changes, time trends might be found. In this case, the wear of the pump during the last year has changed the pump characteristics in such a way that a somewhat differing input pump power is required. By analysing the time scale of changes, different types of changes may thus be distinguished.

Although one advantage of the present invention is the exclusion of in-line sensors, it might be of advantage in certain applications to combine these two approaches. By introducing in-line sensors together with calculated ones, the calculated ones could be treated as target values and a discrepancy to the actually measured ones could indicate an error in the operation.

The different system embodiments above are mainly described as autonomous or separate systems. However, anyone skilled in the art recognize that the described systems in many applications are integrated as parts of a larger system.

FIG. 12 illustrates a preferred embodiment of the method according to one aspect of the present invention. The procedure starts in step 200. In step 202, the input current of motor driving a pump or fan is measured. In step 204, the input voltage of the motor is measured. An output torque of the motor is estimated in step 206 using predetermined relations between on one hand the input current and voltage and on the other hand the output torque. The rotational speed of the motor is estimated in step 208 using predetermined relations between on one hand the input current and voltage and on the other hand the rotational speed. In step 210, rotational speed and torque of the pump or fan is used to calculate the mechanical input power to the pump or fan. Finally, a flow rate of the fluid moved by the pump or fan is estimated in step 212 using predetermined relations between on one hand the mechanical input power and on the other hand the output flow rate. The procedure ends in step 214. However, despite the flow-chart character of FIG. 12, the above procedure should not be considered as a closed procedure, but rather a continuous one. The obtained output results can also preferably be used further, e.g. for purposes of monitoring or control, as described earlier.

FIG. 13 illustrates a preferred embodiment of the method according to another aspect the present invention. The procedure starts in step 300. In step 302, the input current of motor driving a pump or fan is measured. In step 304, the input voltage of the motor is measured. An output torque of the motor is estimated in step 306 using predetermined relations between on one hand the input current and voltage and on the other hand the output torque. The rotational speed of the motor is estimated in step 308 using predetermined relations between on one hand the input current and voltage and on the other hand the rotational speed. In step 310, rotational speed and torque of the pump or fan is used to calculate the mechanical input power to the pump or fan. The time dependency of the mechanical input power is registered instep 312, and in step 314, the time dependency is evaluated for purposes of diagnostics. The procedure ends in step 316. However, despite the flow-chart character of FIG. 13, the above procedure should not be considered as a closed procedure, but rather a continuous one.

The methods according to the present invention may be implemented as software, hardware, or a combination thereof. A computer program product implementing the method or a part thereof comprises software or a computer program run on a general purpose or specially adapted computer, processor or microprocessor. The software includes computer program code elements or software code portions that make the computer perform the method using at least one of the steps previously described in FIG. 12. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server. Such a computer program product can also be supplied via a network, such as Internet.

The present invention has obviously a number of advantages compared to prior art. Other less sensitive sensors combined with software processing replace prior art hardware in-line sensors. This gives a cheaper process monitoring and control. Since the sensors of the present invention are not inserted in the actual flow path, sensor maintenance is simplified and cheaper. Since the pump efficiency $\eta_P$ easily is monitored instantly, an energy consumption optimisation can be obtained. On a superior level, one may e.g. decide the optimum trade-off, in terms of total energy efficiency $\eta_T$, between flow-rate and the operational time, giving a certain transported volume. Furthermore, load diagnostics and process diagnostics is easily available.

It will be understood by those skilled in the art that various modifications and changes may be made to the present invention without departure from the scope thereof, which is defined by the appended claims.

What is claimed is:

1. A device for on-line monitoring of flow quantities in a system comprising a flow-creating device such as a pump or a fan, comprising:

means for obtaining a measure of a torque of said flow-creating device;

means for obtaining a measure of a rotational speed of said flow-creating device; and means for determining a value of a flow rate through said flow-creating device, means for calculating a value of a mechanical input power of said flow-creating device, connected to said means for obtaining a measure of a torque and said means for obtaining a measure of a rotational speed;

storage means for storage of data representing a predetermined relation between mechanical input power and flow rate through said flow-creating device; and whereby said means for determining a value of a flow rate is connected to said means for calculating a value of a mechanical input power and to said storage means;

said means for obtaining a measure of a rotational speed in turn comprising:

at least one current sensor for measuring an input current of an electric motor, said electric motor giving said torque to said flow-creating device at least one voltage sensor for measuring an input voltage over said electric motor; and means for determining a value of said rotational speed, connected to said current sensor, said voltage sensor and said storage means;

said storage means being further arranged for storage of data representing a predetermined relation between input current and input voltage of said electric motor and rotational speed of said electric motor.

2. The device according to claim 1, wherein said means for obtaining a measure of a torque in turn comprises:

at least one current sensor for measuring an input current of said electric motor;

at least one voltage sensor for measuring an input voltage over said electric motor; and means for determining a value of said torque, connected to said current sensor, said voltage sensor and said storage means;

said storage means being further arranged for storage of data representing a predetermined relation between input current and input voltage of said electric motor and output torque of said electric motor.

3. The device according to claim 1, further comprising:

means for determining a value of a flow-creating device efficiency, connected to said means for determining a value of said flow rate and said storage means;

said storage means being further arranged for storage of data representing a predetermined relation between flow rate and flow-creating device efficiency for said flow-creating device.

4. The device according to claim 3, further comprising means for determining a value of an electric motor efficiency connected to said current sensor, said voltage sensor and said means for calculating a value of a mechanical input power.

5. The device according to claim 4, further comprising means for determining a value of a total efficiency, connected to said means for determining a value of a flow-creating device efficiency and said means for determining a value of an electric motor efficiency.

6. The device according to claim 1, further comprising a diagnosing means, connected to said determining or calculating means, for evaluation of time dependencies of mechanical input power, flow or efficiency quantities.

7. The device according to claim 6, wherein said diagnosing means comprises a processor and is connected to said storage means, said storage means being arranged for storing data representing said time dependencies.

8. The device according to claim 7, wherein said storage means is arranged for storing data representing comparison curves of earlier registered time dependencies.

9. The device according to claim 1, further comprising a monitor, connected to said determining means, for monitoring flow or efficiency quantities.

10. A soft starter device comprising a device for monitoring flow quantities according to claim 1.

11. A frequency inverter device comprising a device for monitoring flow quantities according to claim 1.

12. A flow system, having a flow-creating device such as a pump or a fan arranged for moving a fluid, and means for on-line monitoring of flow quantities, said means for monitoring flow quantities in turn comprising:

means for obtaining a measure of a torque of said flow-creating device (12);

means for obtaining a measure of a rotational speed of said flow-creating device; and means for determining a value of a flow rate through said flow-creating device, wherein said means for monitoring flow quantities further comprises:

means for calculating a value of a mechanical input power of said flow-creating device, connected to said means for obtaining a measure of a torque and said means for obtaining a measure of a rotational speed;

storage means for storage of data representing a predetermined relation between mechanical input power and flow rate through said flow-creating device; and whereby said means for determining a value of a flow rate is connected to said means for calculating a value of a mechanical input power and to said storage means;

said means for obtaining a measure of a rotational speed in turn comprising:

at least one current sensor for measuring an input current of an electric motor, said electric motor giving said torque to said flow-creating device;

at least one voltage sensor for measuring an input voltage over said electric motor; and means for determining a value of said rotational speed, connected to said current sensor, said voltage sensor and said storage means;

said storage means being further arranged for storage of data representing a predetermined relation between input current and input voltage of said electric motor and rotational speed of said electric motor.

13. The flow system according to claim 12, wherein said means for obtaining a measure of a torque in turn comprises:

at least one current sensor for measuring an input current of said electric motor;

at least one voltage sensor for measuring an input voltage over said electric motor; and means for determining a value of said torque, connected to said current sensor, said voltage sensor and said storage means;

said storage means being further arranged for storage of data representing a predetermined relation between input current, input voltage of said electric motor and output torque of said electric motor.

14. The flow system according to claim 12, wherein said means for monitoring flow quantities further comprises:

means for determining a value of a flow-creating device efficiency, connected to said means for determining a value of said flow rate and said storage means;

said storage means being further arranged for storage of data representing a predetermined relation between flow rate and flow-creating device efficiency for said flow-creating device.

15. The flow system according to claim 12, further comprising a diagnosing means, connected to said determining or calculating means, for evaluation of time dependencies of mechanical input power, flow or efficiency quantities.

16. The flow system according to claim 12, further comprising a monitor, connected to said determining means, for monitoring flow or efficiency quantities.

17. The flow system according to claim 16, wherein said monitor is positioned remotely in relation to said flow-creating device.

18. A device for on-line diagnostics of performance in a system comprising a flow-creating device such as a pump or a fan, comprising:

means for obtaining a measure of a torque of said flow-creating device;

means for obtaining a measure of a rotational speed of said flow-creating device; and storage means, means for calculating a value of a mechanical input power of said flow-creating device connected to said means for obtaining a measure of a torque and said means for obtaining a measure of a rotational speed;

diagnosing means, connected to said calculating means, for evaluation of time dependencies of mechanical input power;

said means for obtaining a measure of a rotational speed in turn comprising:

at least one current sensor for measuring an input current of an electric motor; said electric motor giving said torque to said flow-creating device;

at least one voltage sensor for measuring an input voltage over said electric motor; and means for determining a value of said rotational speed, connected to said current sensor, said voltage sensor and said storage means;

said storage means being arranged for storage of data representing a predetermined relation between input current and input voltage of said electric motor and rotational speed of said electric motor.

19. The device according to claim 18, wherein said storage means is arranged for storing data representing said time dependencies.

20. The device according to claim 19, wherein said storage means comprises data is arranged for storing data representing comparison curves of earlier registered time dependencies.

21. A method of on-line monitoring flow quantities in a system comprising a flow-creating device such as a pump or a fan, the method comprising:

obtaining a measure of a torque of said flow-creating device;

obtaining a measure of a rotational speed of said flow-creating device, and determining a value of a flow rate through said flow-creating device, based on said measure of a torque and said measure of a rotational speed, calculating a value of a mechanical input power of said flow-creating device based on said measure of a torque and said measure of a rotational speed;

said determining step using said mechanical input power and a predetermined relation between mechanical input power and flow rate through said flow-creating device;

said step of obtaining a measure of a rotational speed in turn comprising:

measuring an input current of an electric motor, said electric motor giving said rotational speed to said flow-creating device;

measuring an input voltage over said electric motor; and determining a value of said rotational speed, using said input current and input voltage and a predetermined relation between input current, input voltage and rotational speed of said electric motor.

22. The method according to claim 21, further comprising:

controlling parameters of said system based on said flow rate.

23. The method according to claim 21, further comprising:

empirically determining said predetermined relation between mechanical input power and flow rate through said flow-creating device prior to installation of said flow-creating device.

24. The method according to claim 21, wherein said step of obtaining a measure of a torque in turn comprises:

measuring an input current of said electric motor;

measuring an input voltage over said electric motor; and determining a value of said torque, using said input current and input voltage and a predetermined relation between input current, input voltage and torque of said electric motor.

25. The method according to claim 24, further comprising:

empirically determining said predetermined relation between input current, input voltage and torque of said electric motor prior to installation of said flow-creating device.

26. The method according to claim 21, further comprising:

empirically determining said predetermined relation between input current, input voltage and rotational speed of said electric motor prior to installation of said flow-creating device.

27. The method according to claim 21, further comprising:

determining a value of a flow-creating device efficiency, using said value of said flow rate through said flow-creating device and a predetermined relation between flow rate and flow-creating device efficiency for said flow-creating device.

28. The method according to claim 21, further comprising:

registering of time dependencies of said mechanical input power, flow or efficiency quantities;

evaluating said time dependencies for diagnosing of the operation of said flow-creating device.

29. The method according to claim 28, wherein said step of registering comprises storing of said time dependencies in a storage means.

30. The method according to claim 29, wherein said step of evaluation comprises comparing said time dependencies with earlier registered time dependencies.

31. The method according to of claim 27, further comprising:
  determining a value of an electric motor efficiency, using said value of said mechanical input power, said input current and said input voltage.

32. The method according to claim 31, further comprising:
  determining a value of a total efficiency, multiplying said flow-creating device efficiency and said electric motor efficiency.

33. A computer program product comprising computer code means and/or software code portions for making a processor perform the steps of claim 21.

34. The computer program product according to claim 33 supplied via a network, such as Internet.

35. A computer readable medium containing a computer program product according to claim 33.

36. A method of on-line diagnosing of performance of a system comprising a flow-creating device such as a pump or a fan, the method comprising:
  obtaining a measure of a torque of said flow-creating device; and
  obtaining a measure of a rotational speed of said flow-creating device,
  calculating a value of a mechanical input power of said flow-creating device based on said measure of a torque and said measure of a rotational speed;
  registering of time dependencies of said mechanical input power; and
  evaluating said time dependencies for diagnosing of the operation of said flow-creating device;
  said step of obtaining a measure of a rotational speed in turn comprising:
    measuring an input current of an electric motor, said electric motor giving said rotational speed to said flow-creating device;
    measuring an input voltage over said electric motor; and
    determining a value of said rotational speed, using said input current and input voltage and a predetermined relation between input current, input voltage and rotational speed of said electric motor.

37. The method according to claim 36, wherein said step of registering comprises storing of said time dependencies in a storage means.

38. The method according to claim 37, wherein said step of evaluation comprises comparing said time dependencies with earlier registered time dependencies.

39. A computer program product comprising computer code means and/or software code portions for making a processor perform the steps of claim 36.

40. A computer readable medium containing a computer program product according to claim 39.

* * * * *